United States Patent [19]

Braun et al.

[11] Patent Number: 4,718,720

[45] Date of Patent: Jan. 12, 1988

[54] CUSHIONED SEAT INCLUDING AN IMPACT MEMBER

[75] Inventors: Dieter Braun, Rheda-Wiedenbrück; Werner Möller, Herzebrock; Werner Thülig, Rietberg, all of Fed. Rep. of Germany

[73] Assignee: Westfalia-Werke Franz Knöbel & Söne Kommanditgesellschaft, Wiedenbrück, Fed. Rep. of Germany

[21] Appl. No.: 897,774

[22] Filed: Aug. 18, 1986

Related U.S. Application Data

[63] Continuation of Ser. No. 674,051, Nov. 21, 1984, abandoned.

[30] Foreign Application Priority Data

Nov. 26, 1983 [DE] Fed. Rep. of Germany ....... 3342881

[51] Int. Cl.⁴ ............................................. B60R 21/00
[52] U.S. Cl. .................................. 297/216; 297/391; 297/452
[58] Field of Search ............... 297/216, 219, 396, 391, 297/243, 452

[56] References Cited

U.S. PATENT DOCUMENTS

| | | | |
|---|---|---|---|
| 2,867,266 | 1/1959 | Vogler | 297/219 |
| 3,464,751 | 9/1969 | Barecki et al. | 297/216 |
| 3,528,703 | 9/1970 | Ohta | 297/391 |
| 3,627,379 | 12/1971 | Faust | 297/216 |
| 3,706,472 | 12/1972 | Mertens | 297/391 X |
| 3,877,749 | 4/1975 | Sakurai et al. | 297/216 |
| 4,109,959 | 8/1978 | Barecki et al. | 297/216 |

FOREIGN PATENT DOCUMENTS

| | | | |
|---|---|---|---|
| 1630981 | 3/1971 | Fed. Rep. of Germany | 297/391 |
| 2927652 | 1/1981 | Fed. Rep. of Germany | 297/391 |
| 2305314 | 11/1976 | France | 297/391 |

Primary Examiner—Francis K. Zugel
Attorney, Agent, or Firm—Louis E. Marn

[57] ABSTRACT

There is disclosed a cushion seat comprised of a cushioned portion of a predetermined height and width, a rigid base member, an elongated inverted U-shaped impact member mounted on the rigid base member and longitudinally extending along an upper edge portion of the cushioned portion wherein the cushioned portion, the base member and impact member are enclosed by a cover member thereby forming a cushioned seat having impact absorbing qualities.

9 Claims, 5 Drawing Figures

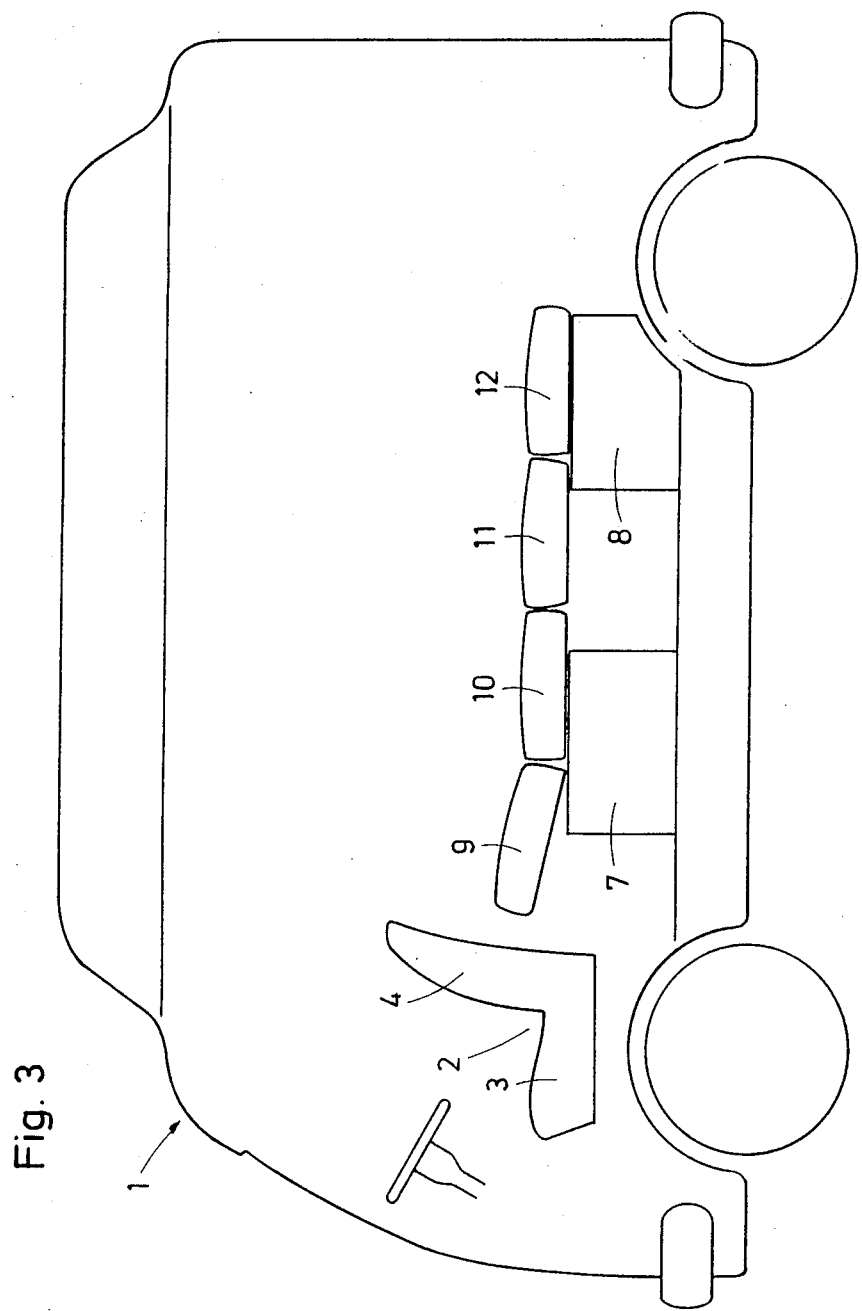

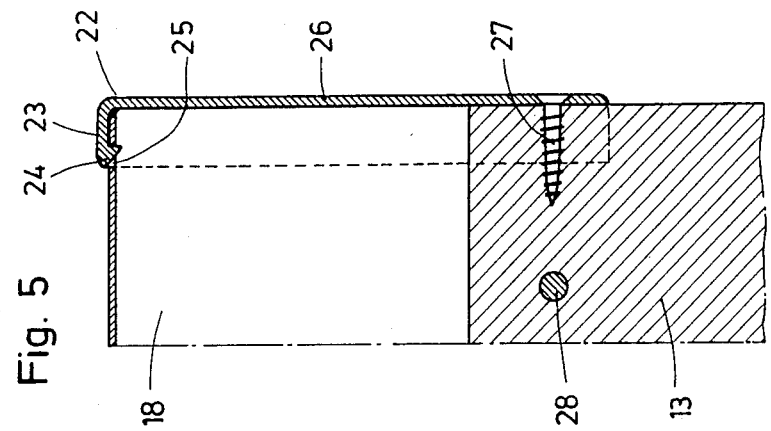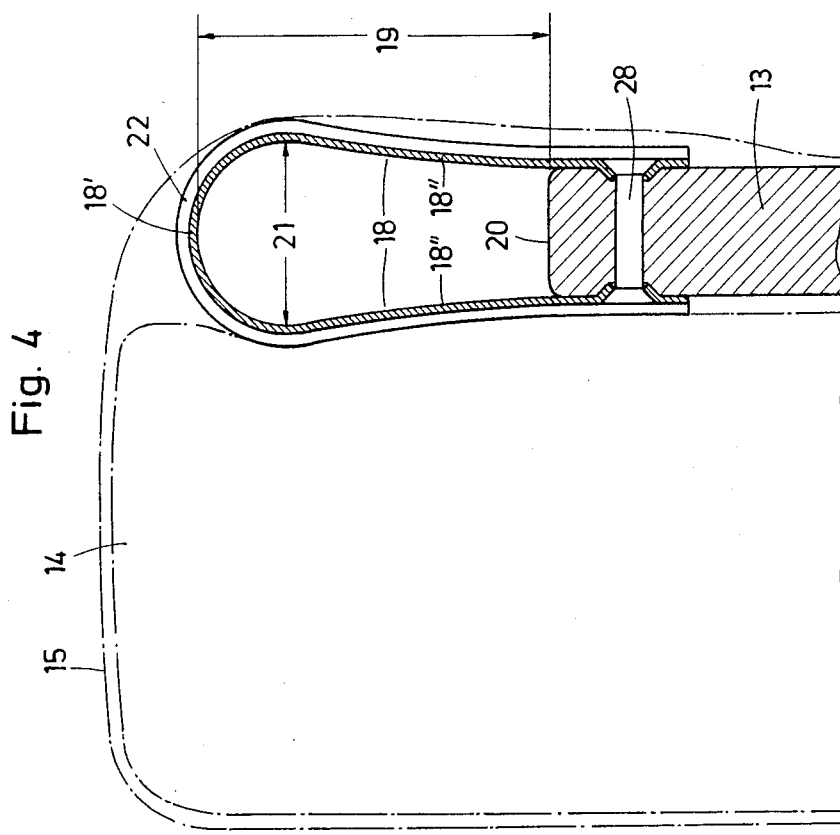

4,718,720

CUSHIONED SEAT INCLUDING AN IMPACT MEMBER

This is a continuation of application Ser. No. 674,051, filed Nov. 21, 1984, now abandoned.

FIELD OF INVENTION

This invention relates to a cushioned seat, and more particularly to a cushioned bench seat having impact dampening qualities for vehicles, such as motor vehicles of the recreational or caravan type.

BACKGROUND OF THE INVENTION

Vehicles, particularly motor vehicles used for transporting people must meet defined safety requirements in their interior space to substantially avoid or at least substantially reduce personal damage as a result of the vehicle being involved in an accident.

The impact areas of a head of a person or persons sitting in the interior of the vehicle, i.e. all unglassed surfaces of the interior of the vehicle with which the head of a person could come into contact during relative acceleration as a result of an accident should be designed with delay valves reaching in milliseconds equal to or smaller than 80 gm. It is also desirable that the interior surfaces of any such vehicle, and also interior equipment or installations therein be designed, particularly, in the impact area of a head, with a sufficiently large deformation path without any breaking or shattering characteristics.

Such safety requirements are particularly desirable for motor vehicles designated as the so-called recreational vehicle or caravan equipped with seating groups in the form of cushioned seat, i.e. cushioned seats which permit a variation in seating groups. A seating group which is arranged successively behind each other in the vehicle in longitudinal direction (See DE-GM No. 77 73 061) such that the seating group can be brought at least into a so-called drive position and a so-called living position, and in most cases also into a so-called sleeping position. In the drive position of the seating group, the combined seats and/or seat benches are adjusted in a uniform position with the cushioned back rests in a position toward the rear of the driving direction. However in the living position, two adjacent cushioned seats in the longitudinal direction of the vehicle and/or bench seats have a homologous position with respect to each other, i.e., the front cushioned seat or the bench seat has an adjustment in the driving direction whereby the cushioned back rest is facing toward the driving direction, whereas the other cushioned seat or sofa seat remains in position.

For the sleeping position, two associated seats or bench seats may be adjusted behind each other in a driving direction so that three cushioned seats or cushioned bench seats are arranged in close relationship behind each other in the same plane, whereas the fourth cushioned seat or cushioned back rest is brought into flat inclined position so as to serve as a raised head rest.

OBJECTS OF THE INVENTION

It is an object of the present invention to provide a cushioned seat of improved safety requirements.

Another object of the present invention is to provide a cushioned bench seat of improved safety requirements with respect to the head impact area for vehicles designed as recreational vehicles or caravans.

Still another object of the present invention is to provide a cushioned back rest for a variable seating group particularly in a drive position.

SUMMARY OF THE INVENTION

These and other objects of the present invention are achieved by a novel cushioned rest comprised of a cushioned portion of a predetermined height and width, a rigid base member, an elongated inverted U-shaped impact member mounted on the rigid base member and longitudinally extending along an upper edge portion of the cushioned portion wherein the cushioned portion, the base member and impact member are enclosed by a cover member thereby forming a cushioned seat having impact absorbing qualities.

DESCRIPTION OF THE DRAWINGS

A better understanding of the present invention as well as other objects and advantages thereof will become apparent upon consideration of the detailed disclosure thereof, especially when taken with the accompanying drawings, wherein:

FIG. 3 is a schematic side view of the minibus of FIG. 1 wherein the bench seats are in a sleeping position;

FIG. 4 is a partial cross-sectional view of the cushioned back rest of the area designated Roman numeral IV of FIG. 1; and FIG. 5 is a partial cross-sectional view along line V—V of FIG. 4.

Referring now to FIGS. 1 to 3, there is schematically illustrated a minibus, generally indicated as 1, equipped in the form of a recreational vehicle or a caravan. The minibus 1 is provided with the usual cushioned driver's seats 2 in the driver's cabin and may be in the form of individual seats or in form of a bench seat comprised of a seat cushion 3 and a cushioned back rest 4.

Figure 1:
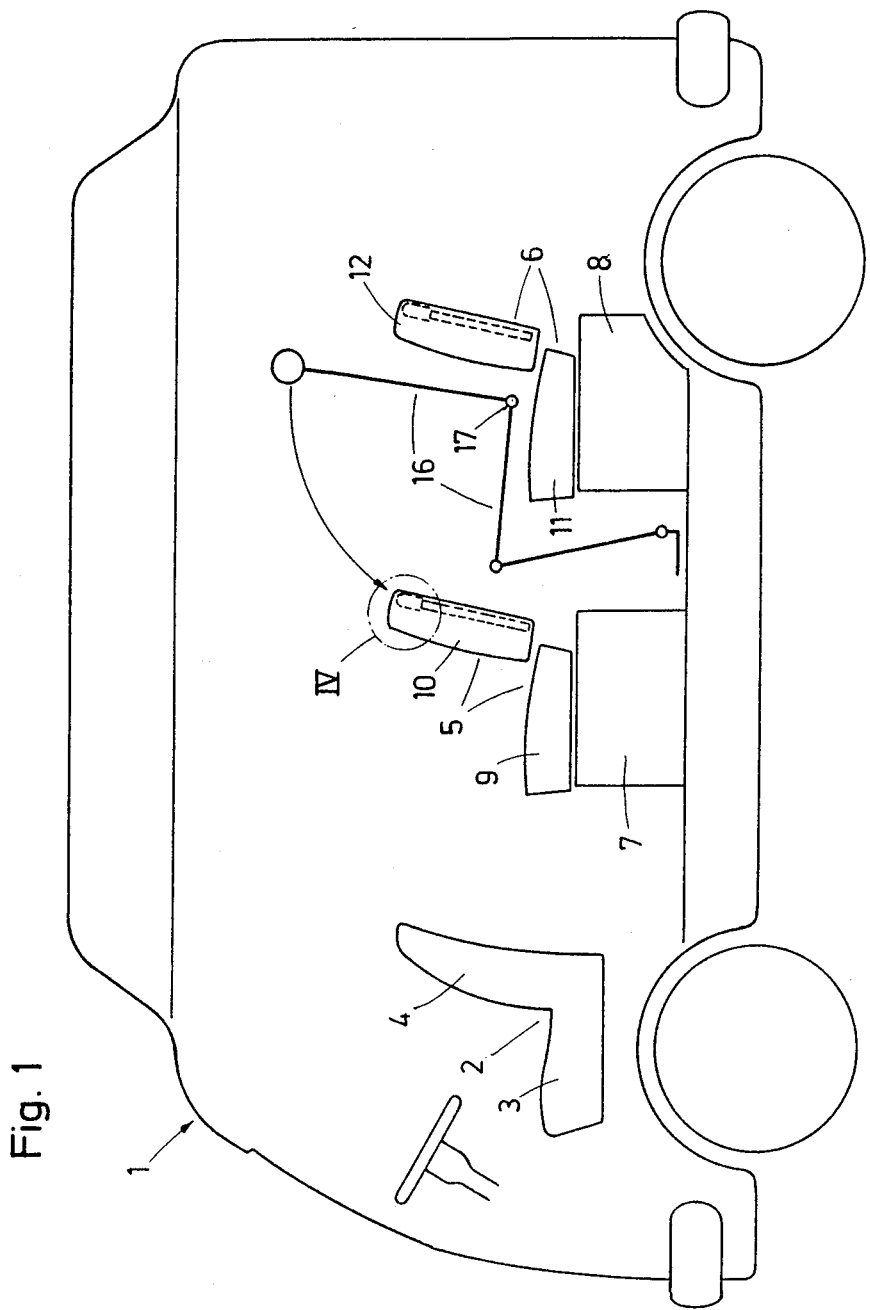
FIG. 1 is a schematic side view of a minibus with bench seats arranged behind each other in the driving direction of the vehicle and behind the driver's cabin.

Two variable groups of seats or seating groups 5 and 6 are provided in the interior section of the minibus 1, successively disposed behind one another to the rear of the driver's cabin and laterally with respect to the vehicle. The seats 5 and 6 may consist of a plurality of adjacent individual cushioned seats, but are preferably arranged as multi-seat bench seats. The cushioned seats or bench seat of the seating group 5 are mounted on a foundation member 7 positioned on the floor of the vehicle and adjustably mounted for longitudinal movement on longitudinally-extending guide tracks (not shown). The cushioned seats or bench seat of seating group 6 is mounted on a foundation member fixedly positioned on the floor of the vehicle. The foundation member 8 may be similarly disposed in guide tracks (not shown) as the foundation member 7.

The cushioned seats or bench seat of seating group 5 are provided with cushioned elements 9 and 10 with the cushioned seats or bench seat of seating group 6 being provided with cushioned elements 11 and 12.

The cushioned elements 9 and 10 of the cushioned seats or bench seat of the seating group 5 as well as the cushioned elements 11 and 12 of the cushioned seats or bench seat of seating group 6 are connected with each other and with their associated foundation boxes 7 or 8 by special fittings (not shown) which make it possible to bring the cushioned elements 9 and 10 as well as cushioned element 11 and 12 into differing relative positions with respect to each other as well as into different angular positions relative to the foundation members 7 and 8. The driving position of the seating groups 5 and 6 are illustrated in FIG. 1 wherein the cushioned seats or bench seats thereof are adjusted into a position in the driving direction. The cushioned element of seating group 5 forms a seat cushion, whereas the cushioned seat element 10 is the cushioned back rest. The seat element 11 of seating group 6 serves as the cushioned seat whereas the cushioned element 12 thereof is the cushioned back rest.

Figure 2:
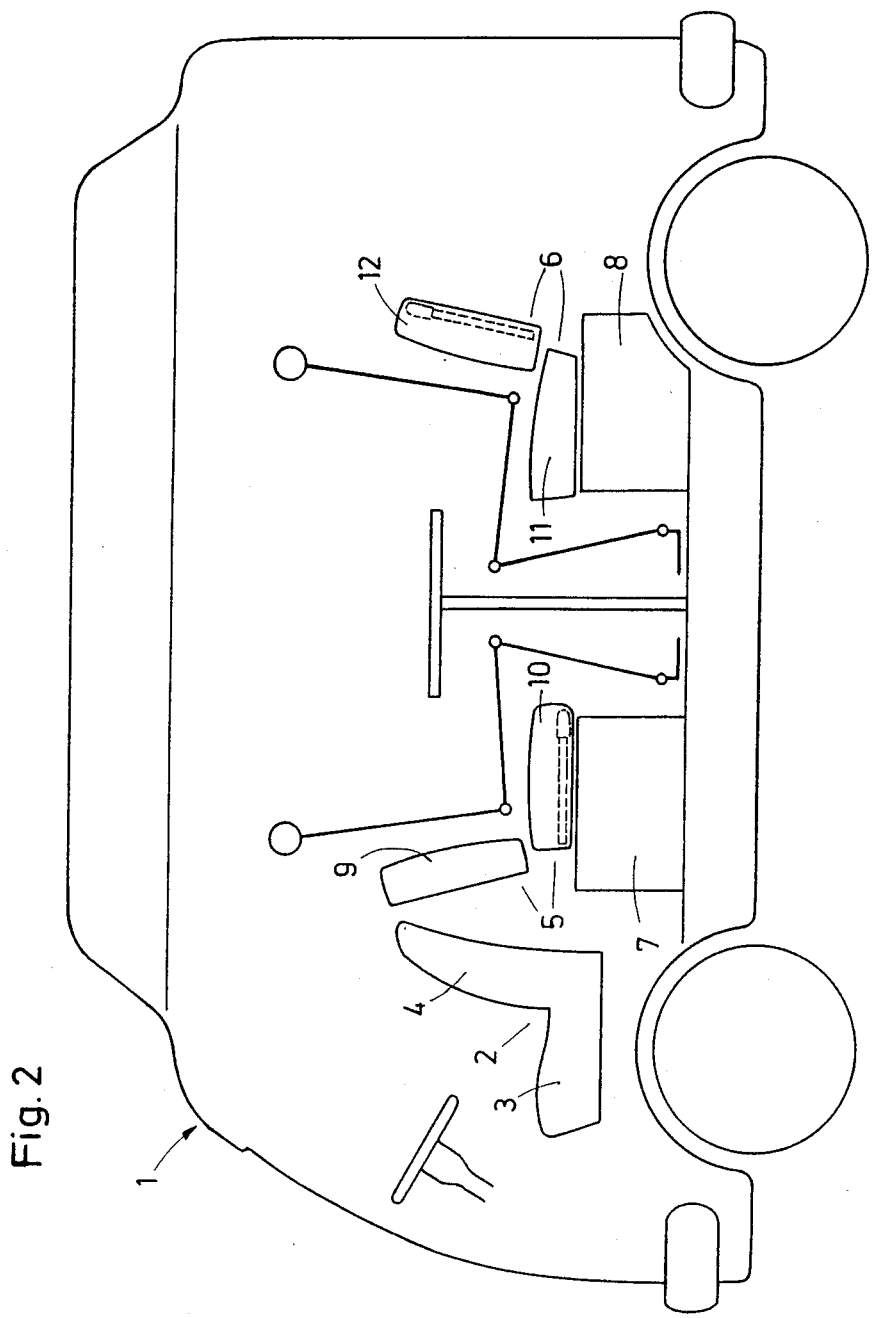
FIG. 2 is a schematic side view of the minibus of FIG. 1 wherein the bench seats are in a living position.

The living position of the seat groups 5 and 6 are illustrated in FIG. 2 wherein the cushioned seats or the bench seat of seating groups 5 is adjusted across from the cushioned seats or bench seat of the seating group 6. In order to provide sufficient leg room between the seating groups 5 and 6 and to permit the placement of a table therebetween, foundation member 7 including the cushioned seats or bench seat of seating group 5 may be displaced from the position shown in FIG. 1 to the position shown in FIG. 2. In FIG. 2, the cushioned seats or bench seat of seating group 6 are in the same position as illustrated in FIG. 1 wherein cushioned member 11 forms the seat cushion, and the cushioned element 12 is the cushioned back rest. In the configuration of FIG. 2, the cushioned seats 9 and 10 of the cushioned seats or bench seats of seating groups are exchanged with respect to the drive position, i.e. the cushioned element 10 forms the seat cushion whereas the cushioned element 9 acts as the cushioned back rest.

Referring to FIG. 3, the cushioned seats or bench seats of the seating groups 5 and 6 are disposed in a sleeping position with the associated respective foundation members 7 and 8 brought into a position to permit successive placement of the cushioned elements 10, 11 and 12 in a horizontal plane, with the cushioned element 9 assuming an inclined position to form a raised head rest.

One of the cushioned seats 9, 10 and 11 or 12 of the cushioned seats or bench seats in seating groups 5 and 6, respectively, is comprised of a cushion portion 14 formed of a relatively thick foam material, a rigid base member 13 and an impact member 18 encased by a cover element 15 formed of a textile material such as fabric, leather, plastic or the like.

The cushioned seat 10 of seating group 5 is provided with the impact member 18 disposed with respect to a person seated in a drive direction of seating group 6, referring to FIG. 1, to absorb a head impact by means of plastic deformation with delay values equal to or smaller than 80 gms. Thus, when the cushioned seats or bench seat of seating groups 5 and 6 are in the drive position as illustrated in FIG. 1, the cushioned seat 10 of seating group 5 is provided with an impact member 18, since in such operating position, the cushioned seat 10 is the cushioned back rest located with its upper edge in the head impact area of any person seated on the cushioned seat or cushioned bench seat of seating group 6, as is shown in FIG. 1 in conjunction with a schematically illustrated standard doll 16. It can be readily seen that the upper body portion of the standard doll 16 is forwardly displaced in a circular arc from the H-point 17, representing the hip joint of a person, whereby any person will hit his/her head on the portion of the cushioned seat 10 including the impact member 18 facing the cushioned back rest of seating group 5.

The impact member 18 of the cushioned seat 10 is mounted to the rigid base member 13 and is formed of a deformable material, e.g. plastic, sheet steel or the like. In cross section, the impact member is the shape of an elongated inverted U as clearly seen in FIG. 4. The impact member 18 may be formed of sheet steel having a wall thickness less than about 1 mm. preferably of from 0.4 and 0.8 mm. The elongated inverted U-shaped impact member 18 is mounted by leg member 18'' thereof to the rigid base member 13 by rivets 28 or the like. It had been advantageously demonstrated that an impact member 18 formed of sheet steel of a wall thickness of about 0.6 mm. at an impact speed of about 25 Km/hr. has a delay value of less than 60 gm. over a static deformation path of more than 50 mm. with a test performed with a standard 16.

The impact member 18 should be of a height 19 above the base member 13 equal to or greater than the width 21 between leg portions 18'' thereof. It is particularly advantageous when the height 19 is greater than the width 21, preferably corresponding to a multiple, e.g. twice that of width 21. Additionally, it has been advantageously demonstrated when the width 21 of the impact member 18 is proportionately larger in a convex curved end portion 18' than the width of the leg portions 18'' mounted to the base member 13. The width of the curved portion 18' of the impact member 18 may correspond to about one and a half times the width of the leg portions 18'' to the base member 13. Preferably, the leg portions 18'' are tangentially formed with respect to the convex curved end portion 18', i.e. a slight convex curved shape to obtain favorable deformation characteristic of the impact member 18.

As illustrated in FIGS. 4 and 5, the free ends of the impact member 18 may be covered by end cap members 22 formed with hook or cam elements 24 inside a belt edge 23 to engage openings 25 formed in the impact member 18, referring particularly to FIG. 5. A base portion of the end cap members 22 are affixed, e.g. by screws 27 to the rigid-base member 13.

It is also possible to connect the plastically deformable impact member 18 to a base member 13 which is not designed as a plate, but is designed as a frame, for example.

It is within the framework of the invention to provide all cushioned elements 9, 10, 11 and 12 associated with seating groups 5 and 6 with a base member 13 having edges provided with an impact member 18 for an optimum of energy conversion. Each cushioned seat or cushioned bench may be arranged within the inside of the minibus 1 in such a manner that its cushion element acting as a cushioned back rest is provided with energy absorbing head impact areas.

What is claimed is:
1. A cushioned seat for a vehicle, which comprises:
a cushion portion of a predetermined height and width;
a rigid base member longitudinally extending along a back part of said cushion portion of a height less than said predetermined height of said cushion portion;
an elongated inverted U-shaped impact member mounted on said rigid base member and longitudinally extending along an upper edge portion about said back part of said cushioned portion of said cushioned seat, said elongated inverted U-shaped impact member being formed of leg members, said leg members of said elongated inverted U-shaped member forming curves with a base portion thereof and wherein a distance (21) between said curves of said elongated inverted U-shaped member is greater than a distance between said leg members of said elongated inverted U-shaped support member at said rigid member, said impact member being formed of a deformable material and of deformable thickness; and a cover member enclosing said cushioned portion, said rigid base member and said elongated inverted U-shaped impact member thereby forming said cushioned seat, said cover member engaging said impact member, said impact member being disposed to receive directly an impact force.

2. The cushioned seat as defined in claim 1 wherein a distance (19) between an upper edge portion of said elongated inverted U-shaped impact member and an upper edge portion of said rigid base member is greater than said distance (21).

3. The cushioned seat as defined by claim 1 wherein said impact member is formed of sheet metal having a wall thickness of less than 1 mm.

4. The cushioned seat as defined by claim 3 wherein said wall thickness in preferable of from 0.4 to 0.8 mm.

5. The cushioned seat as defined by claim 2 wherein distance (19) is more than twice distance (21).

6. The cushioned seat as defined by claim 1 wherein distance (21) is one and one-half times said distance at said rigid base member.

7. The cushioned seat as defined by claim 1 wherein each end of said elongated inverted U-shaped impact member is enclosed by a cap member.

8. The cushioned seat as defined by claim 1 wherein said curves are concave-shaped.

9. The cushioned seat as defined by claim 1 wherein said cushion seat is a cushioned back rest.

* * * * *